United States Patent [19]
Arakawa et al.

[11] Patent Number: 5,220,670
[45] Date of Patent: Jun. 15, 1993

[54] MICROPROCESSOR HAVING ABILITY TO CARRY OUT LOGICAL OPERATION ON INTERNAL BUS

[75] Inventors: Fumio Arakawa, Tokyo; Tetsuhiko Okada, Tama; Ikuya Kawasaki, Tokyo, all of Japan

[73] Assignee: Hitachi, Ltd., Tokyo, Japan

[21] Appl. No.: 336,778

[22] Filed: Apr. 13, 1989

[30] Foreign Application Priority Data

Apr. 15, 1988 [JP] Japan .................................. 63-91561

[51] Int. Cl.⁵ .............................................. G06F 7/00
[52] U.S. Cl. .................................. 395/775; 364/240;
364/259.1; 364/263.1; 364/DIG. 1;
364/927.93; 364/947.1; 364/948; 364/DIG. 2
[58] Field of Search ............ 364/200, 900, 240, 259.1,
364/263.1, DIG. 1, 927.93, 947.1, 948, DIG. 2;
395/775, 800, 275

[56] References Cited

U.S. PATENT DOCUMENTS

| | | | |
|---|---|---|---|
| 4,658,250 | 4/1987 | Nering et al. | 340/825.5 |
| 4,670,846 | 6/1987 | Laws | 364/200 X |
| 4,682,058 | 7/1987 | Gal | 307/473 |
| 4,812,971 | 3/1989 | Butts, Jr. et al. | 364/200 |
| 4,991,078 | 2/1991 | Wilhelm et al. | 364/200 |

OTHER PUBLICATIONS

Mead, Carver and Conway, Lynn. *Introduction to VLSI Systems*. chs. 5 and 6, Addison-Wesley, 1980.
DeGloria, A. "External and Internal Architecture of the P32, A 32 Bit Microprocessor". *Microarchitecture of VLSI Computers*. Boston, 1985.
Mano, M. Morris. *Computer System Architecture*, Prentice-Hall Inc. pp. 43-44, 1976.

*Primary Examiner*—Allen R. MacDonald
*Assistant Examiner*—Glenn A. Auve
*Attorney, Agent, or Firm*—Antonelli, Terry, Stout & Kraus

[57] ABSTRACT

An instruction execution unit of a microprocessor has an ALU, a barrel shifter and a plurality of registers and these circuit blocks are coupled to an internal bus. In response to a specific instruction, the microprocessor operated to transfer output data of the plurality of circuit blocks at a time, so that logical operation of the plurality of output data is carried out on the internal bus at a high speed. The specific instruction designates which ones of the plurality of circuit blocks should transfer data to the internal bus and which one of the plurality of circuit blocks should be stored with the results of the logical operation carried out on the internal bus.

8 Claims, 4 Drawing Sheets

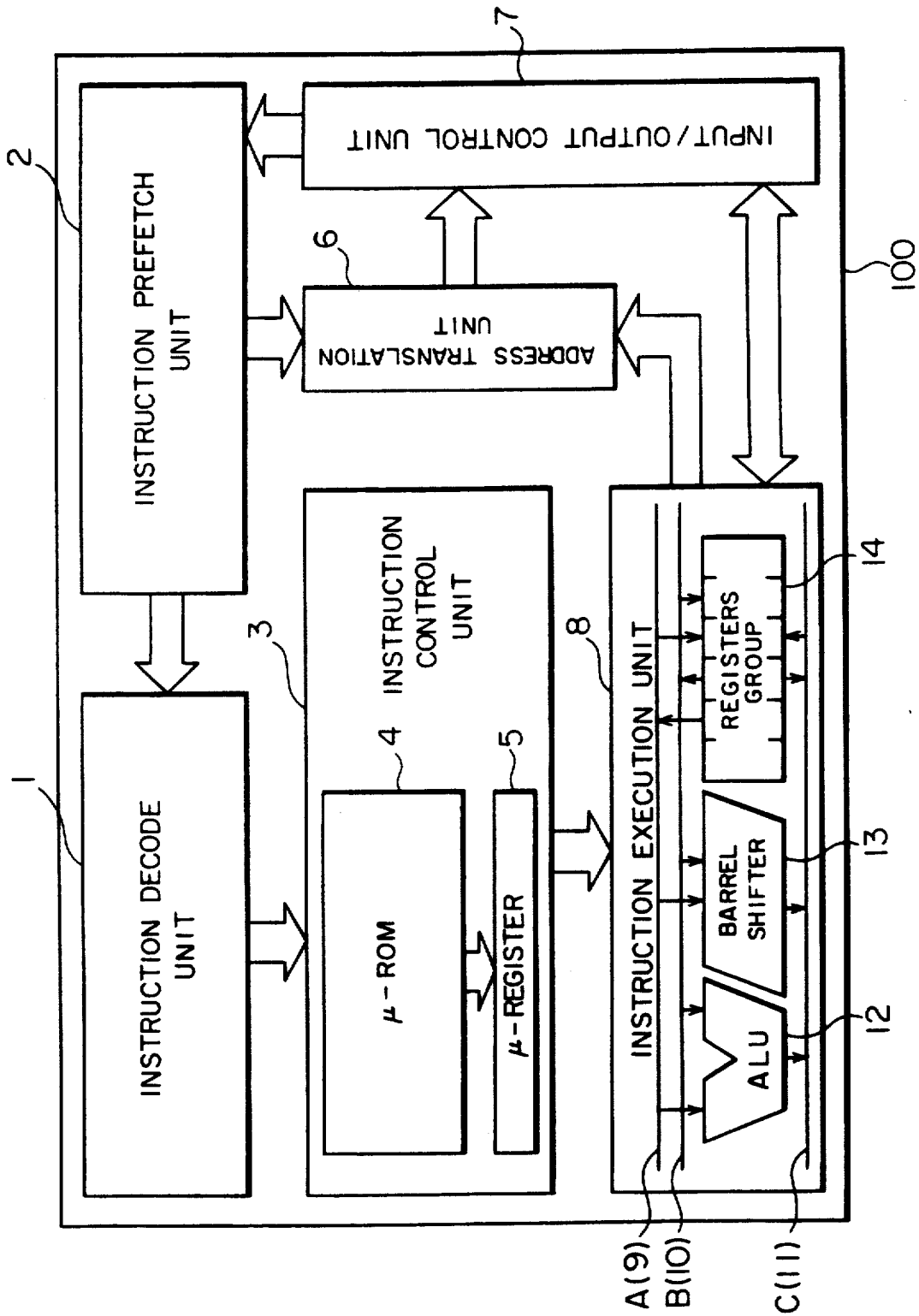

PRECHARGED BUS CIRCUIT.

ALU

5,220,670

MICROPROCESSOR HAVING ABILITY TO CARRY OUT LOGICAL OPERATION ON INTERNAL BUS

BACKGROUND OF THE INVENTION

This invention relates in general to microprocessors and more particularly to a microprocessor which can utilize the internal bus to carry out not only data transfer but also logical operations such as logical product and logical sum operations.

Conventionally, the internal bus of the microprocessor has been used only for data transfer. On the other hand, a bus typical has a construction as described in Introduction to VLSI systems (1980), p. 157, FIG. 5.12, Precharged bus circuit. This bus construction will be described herein with reference to FIG. 2. For example, a high level signal is applied to a terminal $\phi_1$* Enable 1 to permit a signal at a source 1 to be transmitted to a bus line but low level signals are applied to terminals $\phi_1$* Enable 2 and $\phi_1$* Enable 3 to prevent transmission of signals at sources 2 and 3 to the bus line. Accordingly, if the high level signal is applied to two or more Enable terminals, data at the sources can be either ANDed or ORed. The type of the logical operation depends on the structure of the bus and in this example, logical sum can be achieved.

However, it has long been considered that if two or more pieces of data are placed on the internal bus of the microprocessor at a time, then there results a data conflict which prevents transfer of correct values.

SUMMARY OF THE INVENTION

An object of this invention is to provide a microprocessor which can carry out logical operations on an internal bus of the microprocessor to improve data processing speed.

Typically, in accordance with the present invention, a microprocessor is operable to transmit, in response to a specific microinstruction, data from at least two output sources to the internal bus at a time so that logical operations such as AND, NAND, OR, or NOR may be carried out on the bus at high speed.

To this end, the microprocessor of the invention comprises means for decoding the specific microinstruction and controlling the two output sources in accordance with the specific microinstruction.

Thus, the above object of the invention is accomplished by adding the specific microinstruction to the conventional instruction set and a decoder for decoding the specific microinstruction. In accordance with the invention, only a small amount of hardware in addition to that of the conventional control method is needed to practice the invention.

BRIEF DESCRIPTION OF THE DRAWINGS

FIG. 1A is a block diagram illustrating an embodiment of a microprocessor according to the invention;

DESCRIPTION OF THE PREFERRED EMBODIMENTS

Figure 1B:
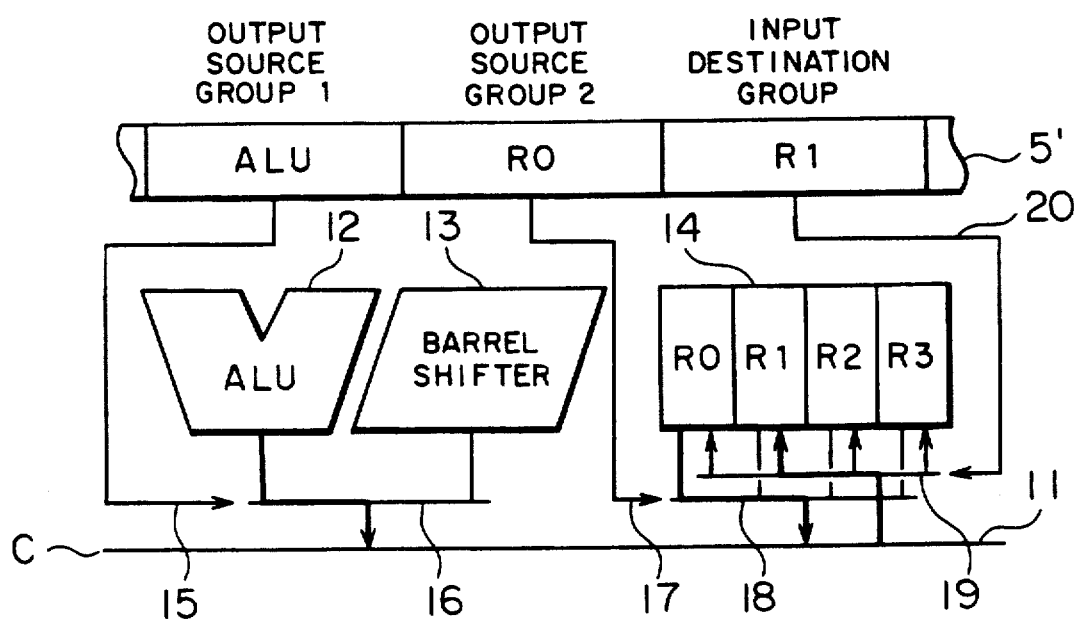
FIG. 1B is a diagram useful for explaining logical sum operations carried out in the FIG. 1A circuit.

Referring now to FIG. 1A, there is illustrated, in block form, an embodiment of a microprocessor according to the invention.

The microprocessor generally designated by 100 comprises on a single chip an instruction decode unit 1, an instruction prefetch unit 2, an instruction control unit 3, an address translation unit 6, an input/output control unit 7 and an instruction execution unit 8.

The input/output control unit 7 of microprocessor 100 is coupled to a main memory (not shown) and to input/output devices (not shown) through an external bus (not shown). Stored in the main memory are instructions and data which are processed by the microprocessor 100.

First, the instruction prefetch unit 2 transfers an instruction address to the address translation unit 6 and at the same time issues a request for prefetching an instruction. The address translation unit 6 converts the logical address from the instruction prefetch unit 2 or instruction execution unit 8 into a physical address and transfers it to the input/output control unit 7. The input/output control 7 prefetches an instruction from the main memory, and transfers the instruction to the instruction prefetch with 2. The instruction prefetch unit 2 then transfers the fetched instruction to the instruction decode unit 1. The instruction decode unit 1 decodes the fletched instruction and transfers decoded information (such as a top address of microinstruction) to the instruction control unit 3.

On the basis of the top address of microinstruction, the instruction control unit 3 reads a microinstruction from a microinstruction ROM 4, latches the microinstruction in a microinstruction register 5 and controls the instruction execution unit 8 in accordance with the latched microinstruction and other decoded information so that the instruction may be executed.

The instruction execution unit 8 includes various units, such as ALU (arithmetic logic unit) 12, and a barrel shifter 13 and a group of registers 14. In the unit 8, data transfer is effected through the internal buses A(9), B(10) and C(11). The barrel shifter 13 performs the function of shifting input data by a desired number of bits to either the right or the left to provide output data. The register group 14 includes a plurality of general purpose registers. Each of the buses A(9) and B(10) is so constructed as to perform AND or NAND logical operations and the bus C(11) is so constructed as to perform OR or NOR logical operations. The bus C(11) can have, for example, the structure shown in FIG. 2 for performing a logical sum operation.

Figure 2:
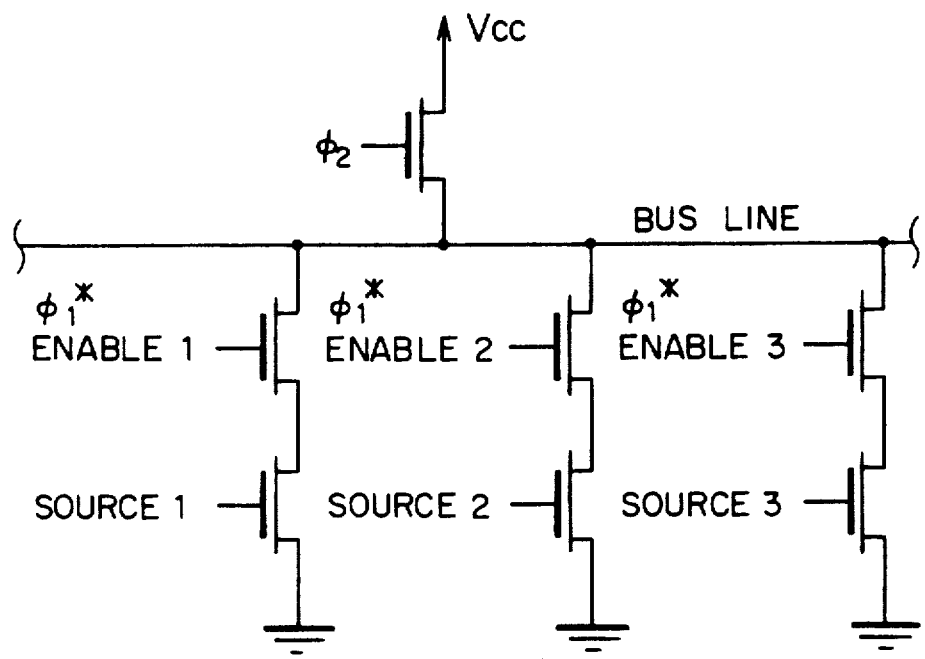
FIG. 2 is a circuit diagram illustrating a prior art precharged bus circuit.

In the FIG. 2 circuit, positive logic is assumed in which zero volts represents logic "0" and Vcc volt represents logic "1". Then, when an input signal representative of the logic "1" of Vcc volt is applied to any one of the sources 1 to 3, the logic "0" of zero volt is obtained on the bus line. Accordingly, in this case, the FIG. 2 circuit acts as NOR circuit and has the logical sum function.

Conversely, negative logic is assumed in which Vcc volt represents logic "0" and zero volt represents logic "1". Then, when input signals representative of the logic "1" of zero volt are applied to all of the sources 1 to 3, the logic "0" of Vcc volt is obtained on the bus line. Accordingly, in this case, the FIG. 2 circuit acts as NAND circuit and has the logical product function.

When fetching or storage of data is required upon execution of the instruction, the instruction execution unit 8 in FIG. 1A issues a request for fetching or storing data and transfers an address to the address translation unit 6. As in the case of the instruction prefetch, the address translation unit 6 converts the logical address into a physical address and transfers the physical address to the input/output control unit 7. On the basis of this address, the input/output control unit 7 operates to fetch or store the data.

FIG. 1B shows an example of a logical sum operation carried out in the FIG. 1A circuit by using the control method according to the invention. In FIG. 1B, reference numeral 5' denotes part of a microinstruction stored in the microinstruction register 5 shown in FIG. 1A. In the register group 14, $R_0$, $R_1$, $R_2$ and $R_3$ denote registers 0, 1, 2 and 3, respectively. The bus C(11) is so constructed as to perform logical sum operation. In this example, output signals of the ALU 12 and register 0 are ORed and the logical sum is stored in the register 1. The output signals of the two output sources are delivered simultaneously to the bus C(11) so as to be ORed, in a manner described below. Group 1 of the output sources includes the ALU 12 and barrel shifter 13 and group 2 of the output sources includes the register group 14. A selective logic circuit 16 selects one of the output sources in the group 1 and a selective logic circuit 18 is adapted to select one of the output sources in the group 2. A signal 15 for controlling the circuit 16 and a signal 17 for controlling the circuit 18 are generated in response to the microinstruction. Thus, in this example, under the command of the microinstruction, the output signal from the ALU 12 in the output source group 1 and the output signal from the register 0 in the output source group 2 are delivered to the bus C(11) and logical sum information appearing on the bus C(11) is supplied to the register 1. The output signals of the designated two output sources are delivered simultaneously to the bus C(11) and ORed thereon with the logical sum transferred to the destination register 1, so that the logical sum information of two values can be stored in the register 1. This process is completed during a period of time for one transfer and therefore the processing speed can be increased as compared to that attained through calculation by means of the ALU 12.

The logical sum operation described herein may be used for a bit-set instruction. More specifically, while data to be processed with the bit set is stored in the register 0, data representing setting bits by "1" and the other bits by "0" is stored in the ALU 12. Under this condition, two values from the register 0 and ALU 12 are delivered simultaneously to the bus and ORed thereon, then the logical sum information is transferred to the register 1, so that bit-set data can be stored in the register 1.

Figure 1C:
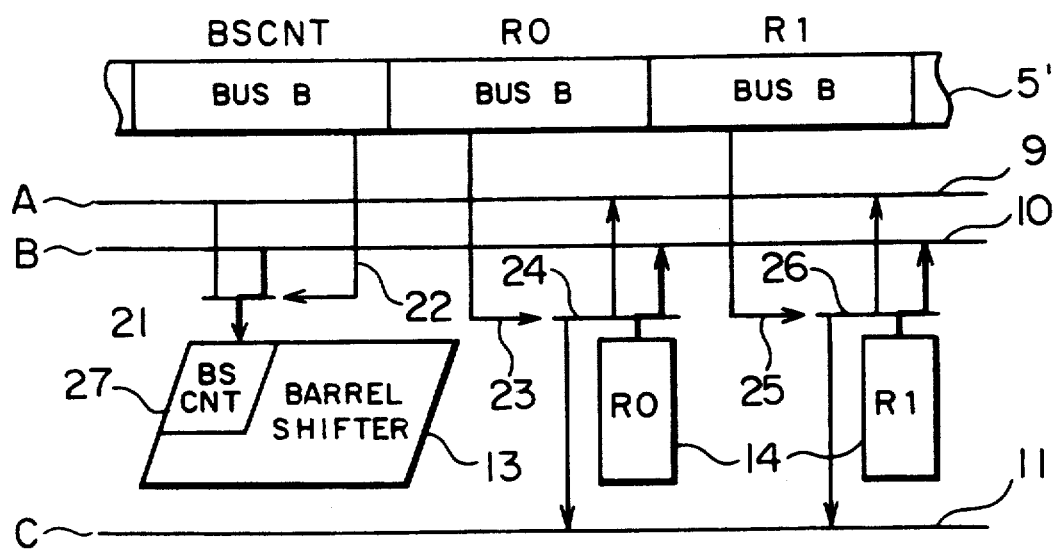
FIG. 1C is a diagram useful for explaining logical product operation carries out in the FIG. 1A circuit.

FIG. 1C shows an example where a value represented by lower five bits in the register 0 is supplied to a barrel shifter control unit in the FIG. 1A circuit by using the control method according to the invention. Such an operation is needed for the following reasons. As a shift count, values of range from −31 to +31 can be designated for the barrel shifter control unit 27. In implementing a bit field operation instruction in accordance with a microprogram, values of 0 to 31 must be set in the barrel shifter control unit 27 by monitoring only the lower five bits of data. For example, if data having lower six bits represented by "111111" is directly set in the barrel shifter control unit 27, then the set value is deemed to be −1. To avoid this inconvenience, the data is first masked to provide only the lower five bits. Thereafter, the five lower bits are set in the barrel shifter control unit 27 so that for the data having the lower six bits of "111111" as exemplified above, 31 can be set in the barrel shifter control unit.

With the conventional prior art control method, this operation requires the following three clock cycles. More particularly, in accordance with the conventional control method, data to be masked is held in the register 0. On the other hand, masking data of "0" for the upper 27 bits and "1" for the lower 5 bits is previously set in the register 1. During the first clock cycle, the masking data and the data to be masked are transferred to the ALU 12 and ANDed to provide only the lower 5 bits of the data. During the second clock cycle, the resulting value is transferred to the register 0 and during the third clock cycle, the value in the register 0 is transferred to the barrel shifter control unit 27.

The above procedure is carried out differently in accordance with the control method according to the invention as will be described below with reference to FIG. 1C. In FIG. 1C, R0 and R1 designate registers 0 and 1. As in the conventional control method, data to be masked is held in the register 0 and masking data is held in the register 1. The bus B(10) is so constructed as to provide logical product information as described above. Output signals from the two output sources are delivered simultaneously to the bus B(10) to provide logical product information, in a manner described below. A logical circuit 24 controls whether the output signal of the register 0 is delivered to a selected one of the buses A(9), B(10) and C(11) or to none of these buses, and a logical circuit 26 performs the same function as circuit 24 on the output signal of the register 1. A signal 23 for controlling the logical circuit 24 and a signal 25 for controlling the logical circuit 26 are generated in response to the microinstruction. Under the command of the microinstruction, the bus B(10) is selected as an output destination of both the registers 0 and 1 and the barrel shifter control unit 27 is selected as input destination of the bus B(10). The output signals of the designated two output sources are delivered simultaneously to the bus B(10) and ANDed thereon, then the logical product information is transferred to the barrel shifter control unit 27 serving as the input destination, so that the logical product information of two values can be stored stored in the barrel shifter control unit 27.

In the example of the conventional control method requiring the three clock cycles, two clock cycles are consumed in order for the ALU 12 to transfer and calculate data and transfer the results of the calculation. Even if the ALU 12 is operated at a maximum speed, the resulting processing speed is slower than the speed for performing only the transfer, proving that the processing speed in the control method according to the invention is higher than that in the conventional control method.

Figure 3:
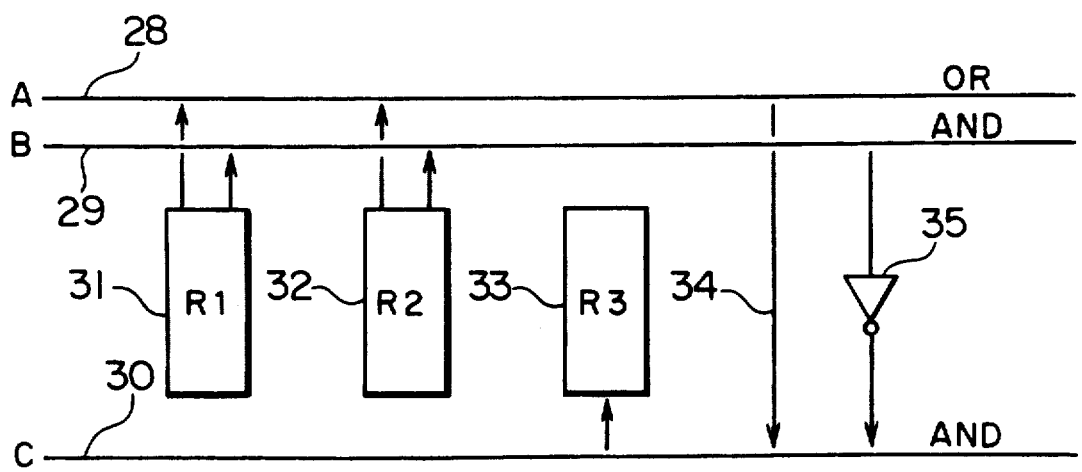
FIG. 3 is a block diagram explaining how an exclusive OR operation is carried out in the FIG. 1A circuit.

As shown in FIG. 3, when logical circuits 34 and 35 are provided so that a value of an internal bus A(28) and a negative value of an internal bus B(29) are used as output source for a bus C(30), it is possible to perform exclusive OR operation. The bus A(28) provides logical sum information and the buses B(29) and C(30) provide logical product information. In FIG. 3, reference numerals 31, 32 and 33 designate registers 1, 2 and 3. Values of the registers 1 and 2 are delivered simultaneously to the bus A(28) and ORed by bus A(28) and delivered simultaneously to the bus B(29) and ANDed by bus B(29), and the logical sum on the bus A(28) and the negated value of the logical product on the bus B(29) are supplied to the bus C(30) to obtain exclusive OR information of the values of the registers 1 and 2. In FIG. 3, this value on the bus C(30) is supplied to the register 3.

Figure 4:
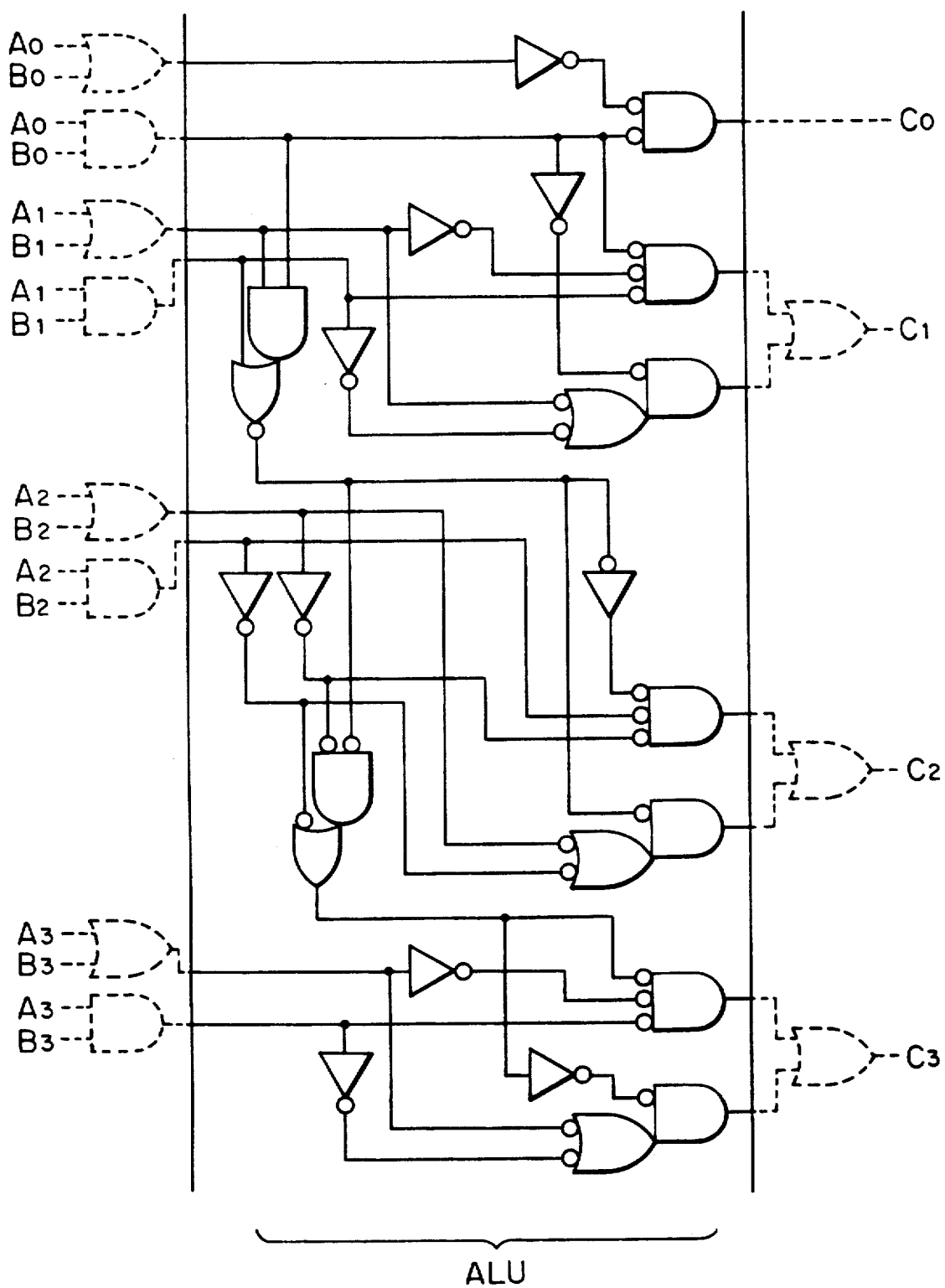
FIG. 4 is a circuit diagram illustrating an embodiment of a 4-bit adder according to the invention providing a higher speed of operation and a reduction in the number of transistors used.

FIG. 4 illustrates an embodiment of an ALU constructed according to the present invention as 4-bit adder for carrying out calculation of $C = A + B$. Since initial (input) two values are ANDed and ORed on the buses during data transfer in accordance with the control method of the invention, this adder can reduce the processing time and can omit logical circuits indicated by dotted line to reduce the number of transistors used. The final (output) processing can also be carried out on the buses and logical circuits indicated by dotted line can be omitted.

The logical product and logical sum operations conventionally carried out by the ALU can be done by the internal bus and therefore the ALU can take part in effecting other processings to promote parallelism of processings.

Further, in the adder shown in FIG. 4, logical operations at dotted-line portions are carried out implicitly by using the bus and as compared to the conventional adder explicitly having logical circuits for carrying out the logical operations at dotted-line portions, the number of logical stages can be reduced and the performance of the adder can be improved.

We claim:

1. A microprocessor comprising:
   an instruction prefetch unit for fetching an instruction externally supplied to the microprocessor;
   an instruction decode unit coupled to the instruction prefetch unit for decoding instructions;
   an instruction execution unit, responsive to decoded information from the instruction decode unit, to execute the instruction, said instruction execution unit having an arithmetic logic unit and a plurality of registers; and
   said microprocessor further comprising an internal bus coupled to said arithmetic logic unit and said plurality of registers of said instruction execution unit, and means responsive to information obtained from decoding a specific instruction by said instruction decode unit, or performing a data processing operation by transferring output data from said arithmetic logic unit and output data from a selected one of said plurality of registers to provide two data outputs to said internal bus during a common time period so as to cause said internal bus to carry out a logical operation on the two data outputs provided to the internal bus.

2. A microprocessor according to claim 1 wherein a result of the logical operation carried out on said internal bus is stored in another of said plurality of registers.

3. A microprocessor according to claim 1 wherein the logical operation carried out on said internal bus in response to said specific instruction is a logical sum operation of said two data outputs.

4. A microprocessor comprising:
   a instruction prefetch unit for fetching an instruction externally supplied to the microprocessor;
   an instruction decode unit coupled to the instruction prefetch unit for decoding instructions;
   an instruction execution unit, responsive to decoded information from the instruction decode unit, to execute the instruction, said instruction execution unit having an arithmetic logic unit and a plurality of registers; and
   said microprocessor further comprising an internal bus coupled to said arithmetic logic unit and said plurality of registers of said instruction execution unit, and means, responsive to information obtained from decoding a specific instruction by said instruction decode unit, for performing a data processing operation by transferring output data from a selected two of said plurality of registers to provide two data outputs to said internal bus during a common time period so as to cause said internal bus to carry out a logical operation on the two data outputs.

5. A microprocessor according to claim 4 wherein said instruction execution unit further includes a barrel shifter coupled to said internal bus, and wherein the result of the logical operation carried out on said internal bus is supplied to said barrel shifter.

6. A microprocessor according to claim 4 wherein the logical operation carried out on said internal bus in response to said specific instruction is a logical product operation of said two data outputs.

7. A microprocessor comprising:
   an instruction prefetch unit for fetching an instruction externally supplied to the microprocessor;
   an instruction decode unit coupled to the instruction prefetch unit for decoding instructions;
   an instruction execution unit, responsive to decoded information from the instruction decode unit, to execute the instruction, said instruction execution unit having an arithmetic logic unit and first, second and third registers; and
   said microprocessor further comprising a first internal bus and a second internal bus, each of which is coupled to said first, second and third registers and to said arithmetic logic unit of said instruction execution unit, first means for transferring data on said first internal bus to said second internal bus, and second means coupled to said first register, said second register and said first internal bus and responsive to information obtained from decoding a specific instruction by said instruction decode unit for performing a data processing operation by transferring output data from said first register and output data from said second register to provide two data outputs to said first internal bus during a common time period so as to cause said first internal bus to carry out a logical operation on the two data outputs.

8. A microprocessor according to claim 7 wherein a result of an exclusive OR operation on said two data outputs is transmitted to said second internal bus through said first means, and the result of the exclusive OR operation present on said second internal bus is stored in said third register.

* * * * *